March 28, 1961 R. Q. SKRMETTA 2,976,564
ASSISTER PEELER FOR SHRIMP PEELING MACHINES
Filed Jan. 2, 1958 4 Sheets-Sheet 1

Raphael Q. Skrmetta
INVENTOR.

March 28, 1961 R. Q. SKRMETTA 2,976,564
ASSISTER PEELER FOR SHRIMP PEELING MACHINES
Filed Jan. 2, 1958 4 Sheets-Sheet 2

Raphael Q. Skrmetta
INVENTOR.

BY Clarence A. O'Brien
and Harvey B. Jacobson
Attorneys

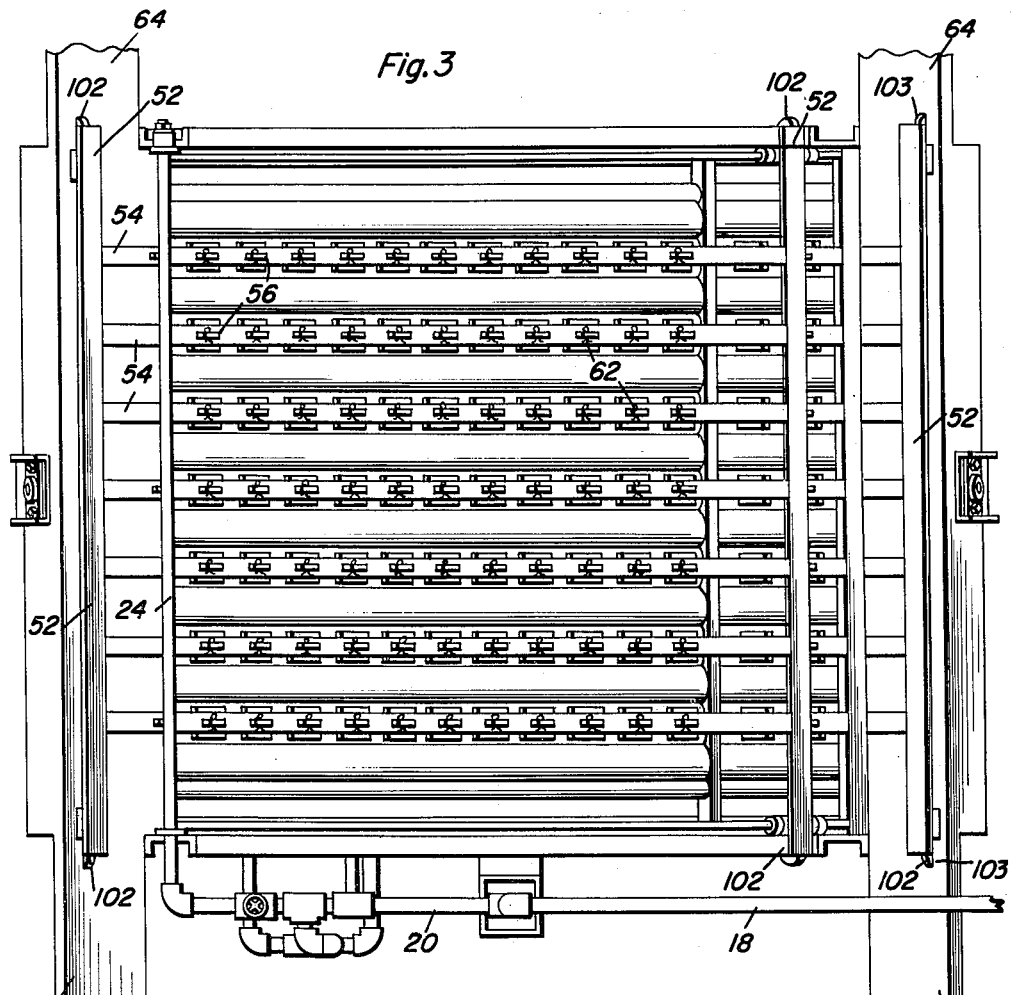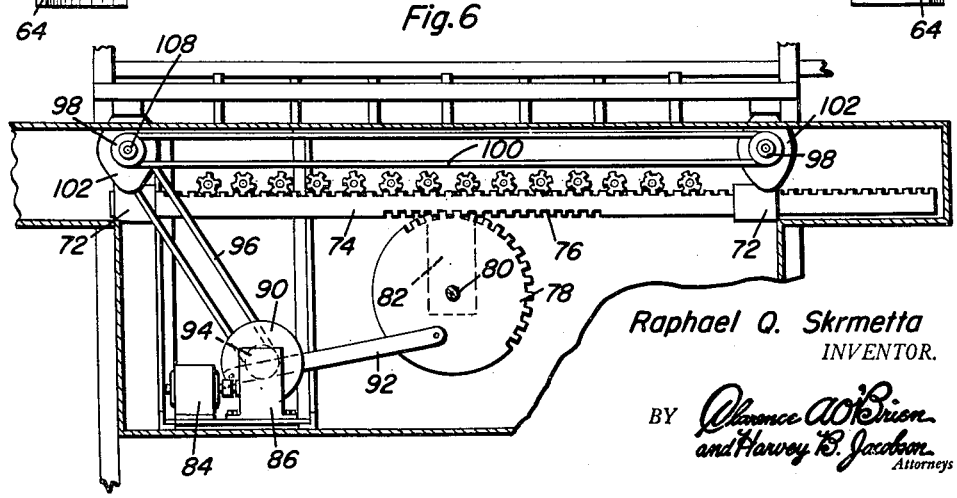

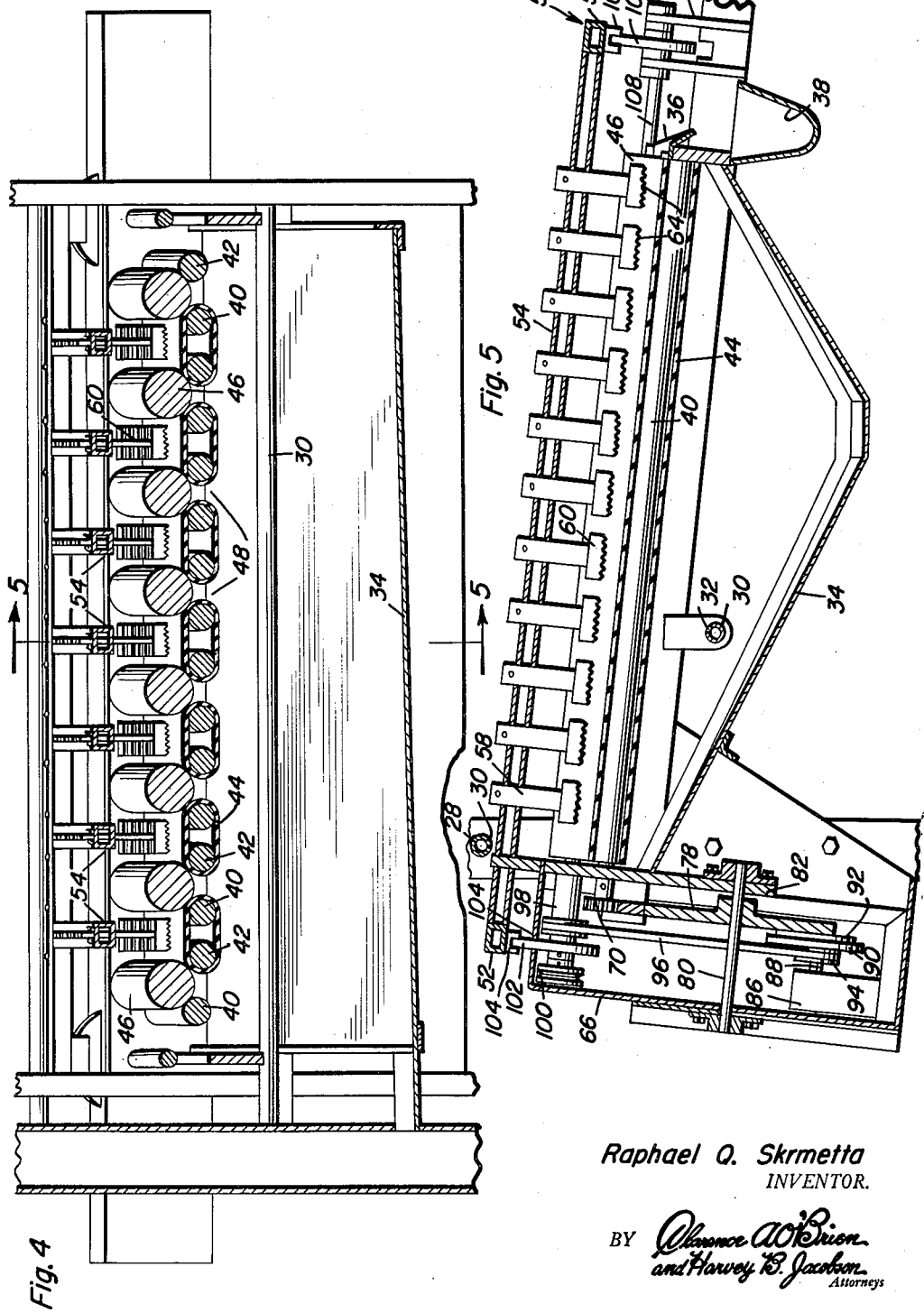

United States Patent Office 2,976,564
Patented Mar. 28, 1961

2,976,564

ASSISTER PEELER FOR SHRIMP PEELING MACHINES

Raphael Q. Skrmetta, Deepsouth Packing Co., 3536 Lowerline St., New Orleans, La.

Filed Jan. 2, 1958, Ser. No. 706,806

30 Claims. (Cl. 17—2)

This invention comprises a novel and useful assister peeler for shrimp peeling machines and more particularly comprises an apparatus comprising an improvement upon the prior patent of Paul C. Skrmetta, Patent No. 2,781,544, issued February 19, 1957, for Seafood Cleaning Machine.

The principal object of this invention is to provide an apparatus which will effectively peel the shell from shrimp.

A further object of the invention is to provide an apparatus which will render more efficient the operation of the oscillating belt and peeler rollers of the shrimp peeling machine set forth in the above-mentioned patent.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a top plan view of the apparatus of Figures 1 and 2;

Figure 4 is a vertical transverse sectional view taken on an enlarged scale substantially upon the plane indicated by the section line 4—4 of Figure 1 and showing in particular the manner in which the pressure elements of the assister peeler are cooperatively associated with the oscillating belt platform and the peeler rollers of a shrimp peeling machine;

Figure 5 is a vertical longitudinal sectional view taken substantially upon the plane indicated by the section line 5—5 of Figure 4;

Figure 1:
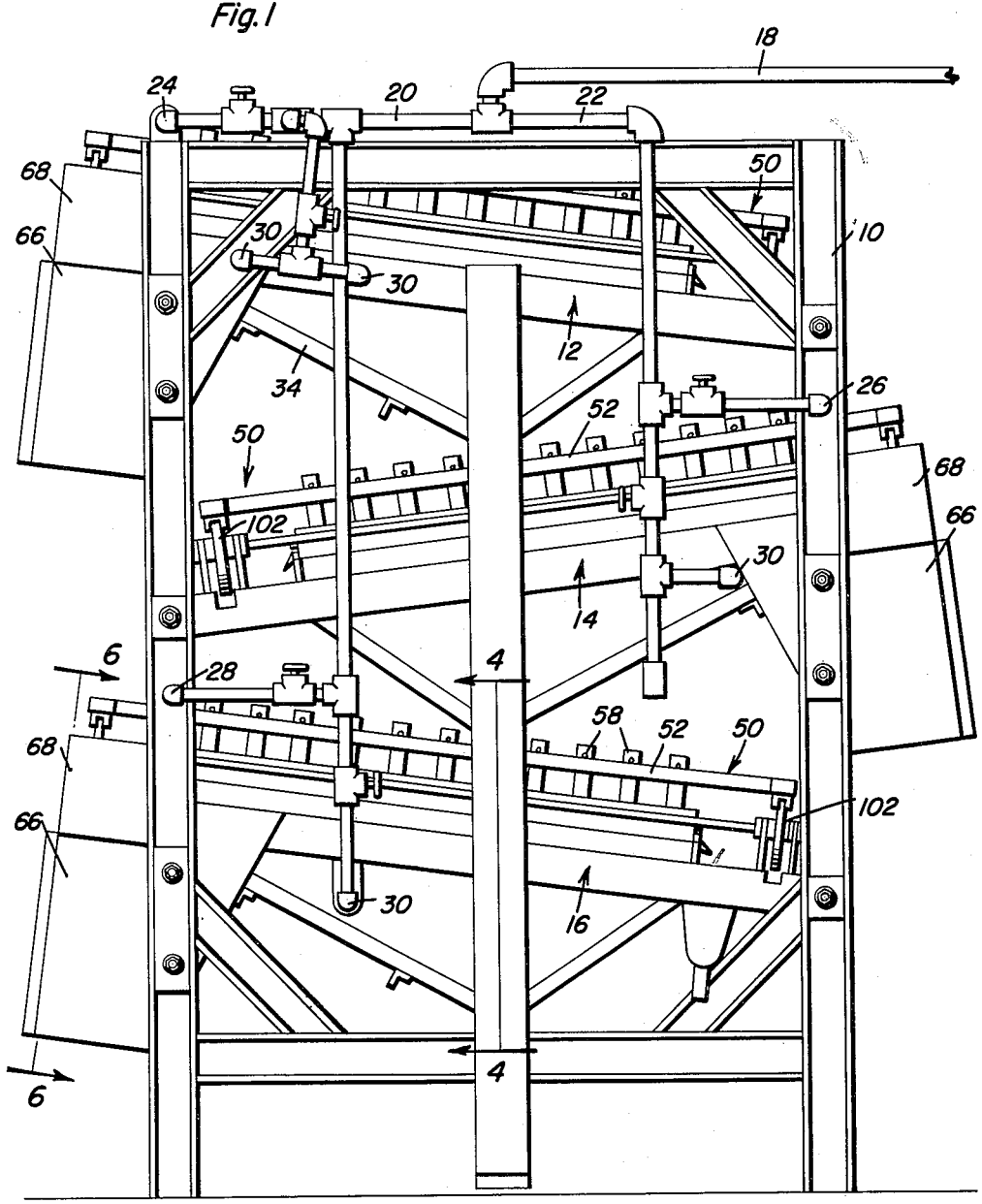
Figure 1 is a side elevational view of a satisfactory form of a shrimp peeling machine incorporating therein the assistant peeler of this invention.

Figure 6 is a vertical transverse sectional view taken substantially upon the plane indicated by the section line 6—6 of Figure 1 and illustrating the construction of the driving mechanism for the shrimp peeling rollers and platforms and for the assister peeler elements of the invention; and Figures 7–10 are diagrammatic sketches illustrating successive steps in the method of operation of the assister peeler in a shrimp peeling machine.

Indicated in Figures 1–6 is any suitable form of a shrimp peeling machine, as for example an apparatus of the same or similar construction of that disclosed in the above-mentioned patent of Paul C. Skrmetta. Inasmuch as the present invention is not concerned with the structural details of such apparatus, a detailed description of the same is deemed to be unnecessary and has been omitted, most portions of the apparatus to which the present invention is particularly related being however illustrated and described.

Briefly, the apparatus consists of a suitable supporting framework indicated generally by the numeral 10 and which supports a plurality of vertically spaced shrimp cleaning units, three such units being shown in Figure 1 and designated generally by the numerals 12, 14 and 16, respectively. These units are inclined to the horizontal, adjacent units being oppositely inclined, and the units are so disposed that shrimp being fed by any suitable means into the upper unit will travel by gravity down the length of the same, and will then successively fall upon and pass along successive lower units.

It is evident that any desired number of the shrimp cleaning units may be employed. For convenience of illustration only, three have been indicated in the drawings, although more or less may be provided as desired and in some instances, a single unit may be found satisfactory for the purposes of this invention. Inasmuch as the construction and operation of the units are substantially identical, the description of one will suffice for an understanding of all, and it is therefore to be understood that the showing and numerals appearing in Figures 3–6 may be considered as applicable to all of the units. It is contemplated also that the dimensions of the oscillating belt constituting the flat shrimp supporting platforms, of the peeling rollers, of the assister peeler elements may be varied within the sphere of this invention as desired. Water is supplied to the upper ends of each of the units for the purpose of facilitating passage of the shrimp under the influence of gravity down the inclined treads provided by each cleaning unit. The water introduced may be in the form of a spray, and such has been illustrated in the accompanying drawings. It is however, also possible to apply just a sufficient quantity of water to maintain the sliding surfaces moist and wet whereby gravity alone will suffice to cause descent of the shrimp through the treads of the cleaning units.

As shown in Fig. 1, a pipe 18 serves to supply water from any suitable source to the upper ends of the cleaning units of the apparatus. For that purpose, branch pipes 20 and 22 conduct water from the supply pipe 18 to the header assemblies 24, 26 and 28 of each of the cleaning units from whence the water is delivered as by the apertures or nozzles 30 in the form of a gentle flow or a spray as desired downwardly upon the upper ends of the inclined cleaning units.

Water is also delivered from these branch pipes to additional header assemblies 30 which are disposed as will be best apparent from Figure 5 beneath the movable element of the cleaner units and by means of nozzles 32 direct a spray upwardly against the same for cleaning these elements.

Each of the cleaning units is provided with a sloping pan 34 to collect the water and the trash falling from the cleaning elements of the cleaning units, for subsequent removal and disposal as desired.

As shown in Figure 5, shrimp discharged from the lower end of the lowermost cleaning unit by means of a chute 36 drop into a trough 38 by which they are delivered to any suitable station for packaging, for subsequent treatment or for any other purpose.

Referring now specifically to Figures 4 and 5 and also to Figure 3, it will be seen that each of the cleaning units 12, 14 or 16, comprises a plurality of longitudinally extending pairs of stationarily mounted, horizontally inclined rollers 40 and 42. Endless flexible belts 44 which may be of rubber or the like are entrained about and embrace substantially the entire length of pairs of rollers 42 and 40 as will be apparent from Figure 4. It will be observed that the arrangement is such that a roller 40 is disposed beyond one side of a series of belted pairs of rollers while the roller 42 is disposed beyond the other side of the same for a purpose to be subsequently set forth.

Each of these rollers 40, 42 is driven in fixed timed relation to each other for oscillatory rotation by a means to be subsequently described. Peeler rollers 46 rest upon the series of belts 44 at opposite sides of the same and also upon the two end rollers 40 and 42. The peeler rollers are of any desired length of the belts and supporting rollers 40, 42 and are frictionally oscillated in response to and by means of the oscillation of the supporting rollers.

For the reasons set forth more clearly in the above mentioned patent of Paul C. Skrmetta, oscillation of the belts 44 and of the peeling rollers 46 associated therewith serves to unwind and peel the sheels or hulls from the shrimp, the shells, hull and other trash passing between the peeling rollers and the adjacent surfaces of the belts 44 and are then dropped and discarded through the throats or openings 48 between adjacent belts, into the sloping pan 34 previously mentioned. It will be understood that the top surface of the belts 44 provides a flat transversely and horizontally reciprocating shrimp supporting surface, whereby as the belts reciprocate, the shrimp will be thrown on the belts from side-to-side against the rollers 16 at opposite sides of the belts. Inasmuch as the construction of belts, rollers and peeler rollers hereinbefore referred to form a part of the invention in the above-mentioned application a further detailed description of the operation of the same is deemed to be unnecessary herein.

It may be here noted however that any desired extent of oscillatory or reciprocatory movement may be imparted to the belts 44. In general however it is preferred that these belts shall be given at least one complete revolution in each direction of travel during their reciprocation. In order to obtain any desired length of travel of the belts during the oscillation or rotary reciprocation, adjustment may be made in the driving mechanism to be subsequently set forth.

The previously described construction is substantially identical with that set forth in the above-mentioned patent of Paul C. Skrmetta. Cooperating with the structure is an assister peeler construction forming the subject matter of the present invention and which serves to increase the efficiency of the above described apparatus.

Each of the cleaner units is provided with an assistant peeler. The latter consists of a supporting frame 50 which is mounted for vertical reciprocation in timed relation to the oscillatory or reciprocatory rotation of the belts 44 in a manner to be now set forth.

The frame 50 consists of a pair of parallel beams comprising end members 52 together with a plurality of parallel bars or beams 54 comprising cross members which are connected to the end members. There is provided one such bar or beam 54 for each of the belts 44, and the member 54 is disposed above and between adjacent peeler rollers 46 as will be best apparent from Figure 4.

The bars 54 are longitudinally slotted as at 56, see Figure 3, and loosely and slidably secured in each of the slots is the stem 58 of a presser member 60, cotter pins or the like 62 may be provided in the stems to retain the presser members in vertically and loosely sliding engagement in the slots 56 of the bars 54.

The bottom surfaces of the presser member 60 are preferably serrated as shown at 64 and are disposed in parallel relation with the top surface of the belt 44 immediately thereunder.

Figure 2:
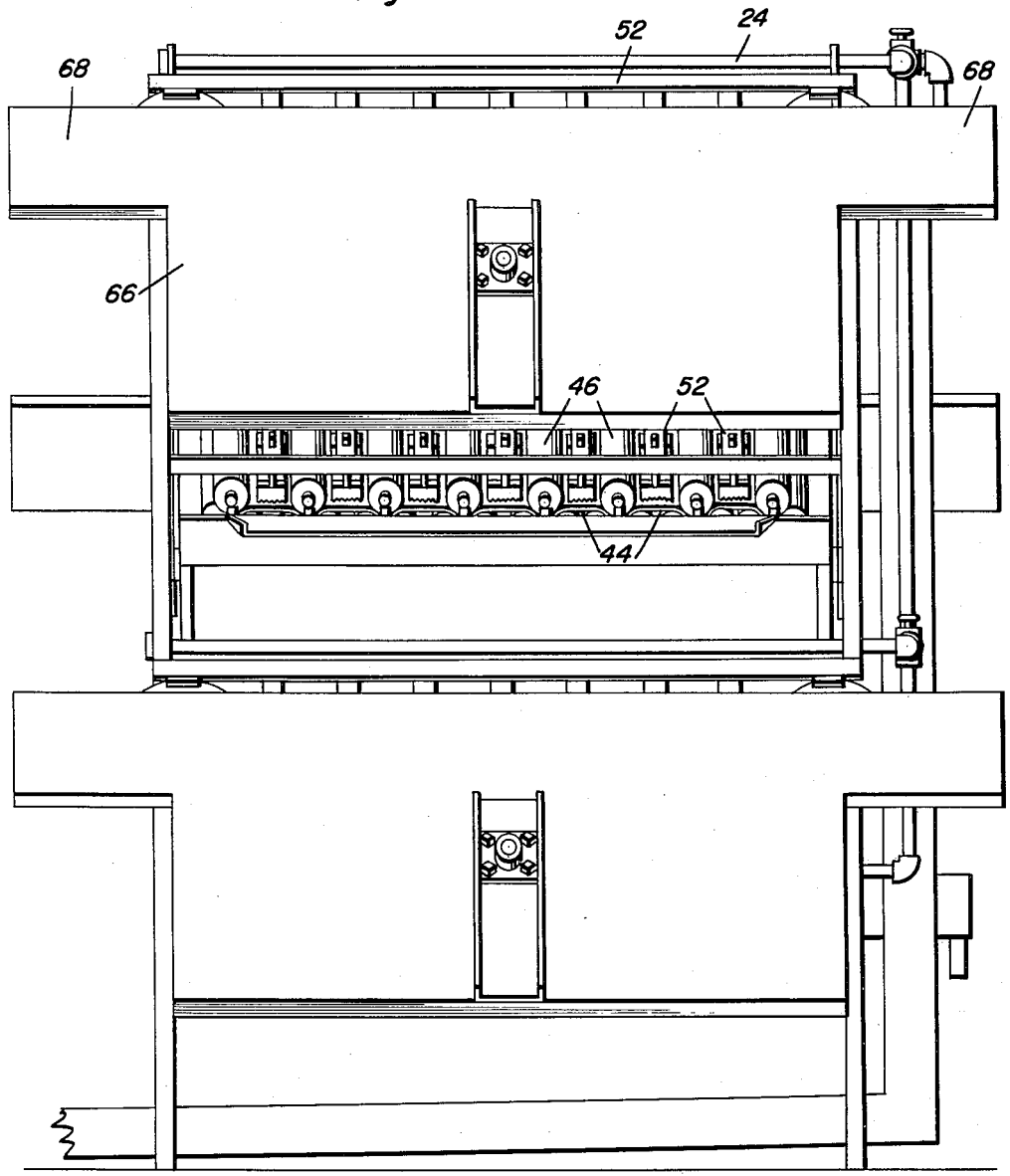
Figure 2 is an end elevational view at the left side of Figure 1.

Each of the cleaner units is provided with a housing 66 which contains the mechanism for operating the support rollers and belts and also for imparting reciprocatory movement to the supporting frame 50 of the asssister peelers. Referring especially to Figures 2 and 6 it will be observed that the housing 66 at its upper end has transversely extending lateral projections 68. Each of the above mentioned support shafts 40 and 42 have one end thereof extending into the housings 66 and are provided with gears 70. Journalled in guide bearings 72 is a rock bar 74 whose surface has its teeth engaging the above-mentioned gears 70. The lower surface of the rack bar as a toothed portion 76 which is engaged by a driving gear 78 carried by a shaft 80 which is journalled in the housing 66 and in a bearing support 82.

An electric motor 84 constituting the source of power for the mechanism of each of the cleaning units is operatively connected to a reduction gear assembly indicated generally by the numeral 86. The latter has a power output shaft 88 with a crank disk 90 thereon, a connecting rod 92 operatively connects the crank disk to the gear 78 whereby rotation of the disk 90 will impart oscillatory rotation to the gear 78. Thus continuous rotation of the disk 90 is converted into a reciprocating transillatory motion of the lock bar 74 and the rack teeth upon the upper surface of the same in turn impart oscillatory or reciprocatory rotary motion to the support shafts 40 and 42 previously mentioned. It will be understood that any suitable means may be provided in order to vary the amplitude of the reciprocation of the rack bar 74, and thus vary the amplitude of oscillatory or reciprocatory movement of the support rollers and the belts 44.

As shown in Figures 5 and 6, the power take-off shaft 88 of the reduction gear assembly is also provided with a power take-off member 94 which may be in the form of a belt, sprocket gear or the like, and over which is entrained a driving member 96.

At the upper end of the housing 66 there are provided a pair of countershafts 98 which are connected together in a fixedly timed relation as by a connecting belt, chain or the like as shown at 100. Carried by the countershafts 98 are actuating cams 102 which extend upwardly through suitable slots or openings 104 in the top of the housing 66 and which are received in channel members 106 comprising tracks or rails mounted upon the lower sides of the end members 52 of the supporting frame assembly of the assister peelers.

At the other end of each of the cleaner units there are provided suitable supports 106 between which are rotatably mounted a further set of cams 102 which likewise are received in the channel members 104 of the other end frame members 52. It will thus be apparent that the cams 102 are rotated in unison with rotation of the support shafts 40 and 42, and through their engagement with the supporting frame 50 serve to impart vertical reciprocation to the presser member 60.

Figure 7:
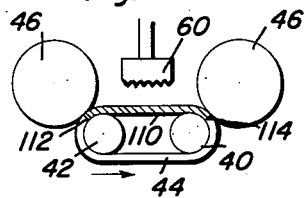
Figure 8:
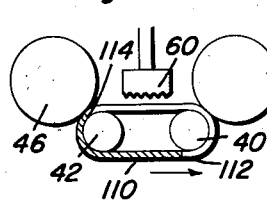
Figure 9:
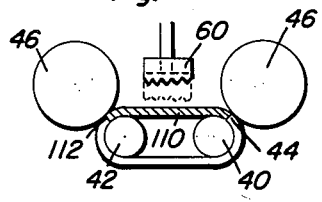
Figure 10:
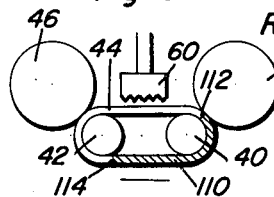

At this point it should be noted that the presser members are so positioned that at their lowest position, as shown in Figures 8 and 10, there will be disposed in vertically spaced relation to the upper surface of the belts 44, on their raised position, shown in Figures 7 and 9, it will be disposed at a greater distance above these belts. In their lower position, the presser members are adapted to rest upon the body of a shrimp supported by the upper surface of a belt 44, while in their raised position they will permit free passage of the body of the shrimp therebeneath, as set forth hereinafter.

If desired, shafts 108 may operatively connect the cams 102 and shafts 98 in the housing 66 with the shafts upon which the cams 102 mounted upon the supports 106, whereby all of the cams may be operated in unison.

The operation of the shrimp peeling machine to which this assister peeler is applied is as follows:

Shrimp are discharged by any suitable means to the uppermost end of the topmost cleaning unit, and then will pass by gravity down the inclined troughs by the top shrimp supporting surfaces of the belts 44 and the two adjacent peeling rollers 46. During this descent of the shrimp gravity alone may be relied upon to cause the shrimp to move downwardly over the surfaces wet from the water supply thereto, or in some instances it may be preferred to employ the force of the water spray to assist in causing downward travel of the shrimp. In any event, as the shrimp slide down the inclined troughs, they will be thrown from one side to the other by the oscillating or reciprocatory rotation of the belts. Thus, the shrimp will be delivered to first one of the rollers 46 by the movement of the belt, and thereafter will be thrown to the other roller across the trough from the first roller. As the shrimp is carried to the crotch between a roller and the surface of the belt 44 upon which the shrimp rests, the shell or hull of the shrimp will be caught in the crotch between the roller 46 and the belt 44 and drawn from the shrimp and discharged through the throat 48.

It sometimes happens however that the crotch formed by the roller and the belt fail to catch the shell or hull of the shrimp as soon as the shrimp is brought into contact with this crotch, so that when the belt reverses its direction of travel, some of the shrimp may not travel all the way across to the opposite roller and crotch before the belt again reverses rotation. It is for this purpose that the assister peelers of this invention are provided.

As hereinbefore set forth, there is a timed relation between the vertical reciprocation of the presser member 60 and the rotation of the belts. The arrangement is such that after the initial travel of the belt from one direction, with the presser member being raised so as not to interfere with the passage of the shrimp, from one roller to the other, the presser members are lowered so that they will catch and rest upon any shrimp which have not completed their travel across the belt to the opposite roller. Thereafter, during the completion of the travel of the belt, the shrimp will be held in place so that the movement of the belt will cause rotation of the shrimp between the belt and the roller, thereby facilitating the loosening of the shell or hull from the shrimp and preparing it for more effective engagement by a crotch of the belt and roller upon reversal of movement of the latter. When the belt starts its reverse travel, the presser members are all raised, so that the shrimp caught between the rollers will at once move to and be the first shrimp to engage in the opposite crotch of the belt and roller.

The steps in the method of operation of the supporting rollers, peeling rollers and belts and the presser members are brought out in the series of diagrammatic views of Figures 7–10.

Referring first to Figure 7 it will be assumed that the belt 40 is ready to begin its movement in the direction indicated by the arrow in the figure. The shaded portion of the belt indicated by the numeral 110 has one extremity 12 disposed in contact with the peeling roller 46 which is adjacent the support roller 42, while the other extremity 114 of this portion of the belt is in contact with the peeling roller 46 which is adjacent to the support roller 40. At this time the presser member 60 is raised.

After a predetermined interval of travel of the belt in the direction indicated by the arrow, the portion 110 has moved until its end 114 is disposed at the junction of the peeling roller 46 with the supporting roller 42.

At this position, as shown in Figure 8, the presser member 60 is lowered thus trapping between it and the belt any shrimp which have not completed their travel across the belt to the opposite peeling roller. The belt then continues its travel until the position shown in Figure 9 is reached, at which time the portion 110 has returned to its original position, the presser member 60 remaining in its lowered position as shown in dotted lines in Figure 9. At this instant the direction of rotation of the support rollers and belts and the peeling rollers is reversed, the presser member being raised to its full line position shown in Figure 9. After the same length of travel as that between the positions of Figures 7 and 8, the position of Figure 10 is reached, at which time the presser member 60 is again lowered, and thereafter remains lowered until the belt completes its travel in that direction. Thereupon the presser member is raised, this position being shown in Figure 7, and the cycle is repeated.

It will be understood that any desired length of travel may be given to the belt, and further, any desired time may be chosen for lowering of the pressure members 60 and these may be retained lowered for any desired duration.

One satisfactory arrangement and timing of the device may comprise a 10 inch travel of the belt in each direction of rotataion, with the portion 110 being about 4 inches in length. It is understood, however, that the invention is not limited to any particular dimensions or timing of the elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shrimp treating machine comprising a member having a flat, reversibly moving surface upon which shrimp are supported and conveyed, a peeling element operatively associated with said surface for peeling shrimp conveyed thereto by said surface, an assister peeler disposed above and cooperating with said surface and being positioned in spaced relation to said peeling element, means for causing movement of said assister peeler toward and from said surface in timed relation to movement of said surface toward said peeling element to thereby press shrimp between said assister peeler and said surface and rotate said shrimp about their longitudinal axes and loosen their shells while temporarily halting travel of said shrimp by said moving surface to said peeling element.

2. A machine for loosening the shell of shrimp in preparation for peeling shrimp comprising a conveying member having a flat moving surface for supporting and conveying shrimp to a peeling element, a presser member disposed above said surface and mounted for movement toward and from said surface, said presser member having a surface cooperating with said moving surface for retaining a shrimp therebetween and temporarily halting movement of said shrimp towards said peeling element and causing rotation of said shrimp about their longitudinal axes by continued movement of said moving surface while said shrimp are being held beneath said presser member surface.

3. A shrimp treating machine comprising a conveying member having a flat surface for supporting and conveying shrimp, a pair of spaced peeling elements each associated with said surface for peeling shrimp conveyed thereto by said surface, means for reciprocating said surface and thereby convey shrimp thereon back and forth between said peeling elements, a presser member disposed above said surface between and in spaced relation to both said peeling elements, means supporting said presser member above said surface and means connected to said presser member for causing movement of the latter towards and from said surface in timed relation to reciprocation of the latter to thereby trap and squeeze shrimp between said presser member and said surface and temporarily stop movement of said shrimp towards said peeling elements while the motion of said surface rolls said trapped shrimp upon their longitudinal axes and loosens the shells of the shrimp.

4. For use with a shrimp peeling machine having a peeling means and a transversely reciprocating substantially flat shrimp supporting surface for moving shrimp towards and from said peeling means; an assister peeling means comprising at least one presser member disposed above said surface and spaced from said peeling means, said presser member having a lower surface opposed to said flat surface, actuating means connected to said presser member for moving its lower surface towards and from said flat surface thereby compressively retaining shrimp between said surfaces and temporarily halting travel of the shrimp towards said peeling means and effecting rotation of the shrimp upon their longitudinal axes by continued movement of said flat surface.

5. The combination of claim 1 including means disposed on the opposite side of said assister peeler from said peeling element and cooperating with said member for limiting travel of shrimp away from said peeling element.

6. The combination of claim 5 wherein said last mentioned means is spaced from said assister peeler.

7. The combination of claim 1 wherein said means for causing movement of said assister peeler is effective to produce at least one movement of the latter toward said surface for each movement of the latter towards said peeling element.

8. The combination of claim 1 wherein said means for causing movement of said assister peeler is effective for positioning and retaining said assister peeler in shrimp pressing position relative to said moving surface throughout a portion only of the movement of said surface toward said peeling element.

9. The combination of claim 1 wherein said means for causing movement of said assister peeler is effective for positioning and retaining said assister peeler in shrimp pressing position relative to said moving surface throughout a portion only of the movement of said surface toward said peeling element, said positioning and retaining being effected during the intermediate portion only of said movement of said surface toward said peeling element.

10. The combination of claim 1 wherein said means for causing movement of said assister peeler is effective for positioning and retaining said assister peeler in shrimp pressing position relative to said moving surface throughout a portion only of the movement of said surface toward said peeling element, said positioning and retaining being effected during the intermediate portion only of said movement of said surface toward said peeling element.

11. The combination of claim 1 wherein said means for causing movement of said assister peeler is effective for positioning and retaining said assister peeler in shrimp pressing position relative to said moving surface throughout a portion only of the movement of said surface from said peeling element.

12. The combination of claim 1 wherein said assister peeler has a serrated surface for engaging shrimp.

13. The combination of claim 1 wherein said assister peeler has a shrimp engaging surface which opposes said moving surface, at least one of said surfaces being yieldable.

14. The combination of claim 1 wherein said member and said peeling element have surfaces of different materials and coefficients of friction.

15. The combination of claim 2 wherein said member has its flat moving surface yieldable.

16. The combination of claim 2 wherein at least one of said surfaces is yieldable.

17. The combination of claim 2 wherein said presser member has its surface always spaced from said moving surface.

18. The combination of claim 3 wherein said means for causing movement of said presser member is effective to produce at least one movement of the latter towards said moving surface for each reciprocating movement of the latter.

19. The combination of claim 3 wherein said means for causing movement of said presser member is effective for positioning and retaining the latter in shrimp pressing position relative to said moving surface throughout a portion only of a reciprocation of the latter.

20. The combination of claim 3 wherein said means for causing movement of said presser member is effective for positioning and retaining the latter in shrimp pressing position relative to said moving surface throughout a portion only of a reciprocation of the latter, said positioning and retaining being effected during the intermediate portion only of said reciprocatory travel of said moving surface from one peeling element to the other.

21. The combination of claim 3 wherein said means for causing movement of said presser member is effective for positioning and retaining the latter in shrimp pressing position relative to said moving surface throughout a portion only of a reciprocation of the latter, said positioning and retaining being effected during the intermediate portion only of the reciprocatory travel in both directions of said moving surface between said peeling element.

22. The combination of claim 3 wherein said presser member has a shrimp engaging surface opposing said moving surface, at least one of said surfaces being yieldable.

23. The combination of claim 1 wherein said assister peeler includes a supporting frame and a presser member movably mounted upon said frame and having a shrimp engaging surface cooperating with and opposed to said moving surface.

24. The combination of claim 23 including a connection securing said presser member to said frame for limited relative movement.

25. The combination of claim 1 wherein said assister peeler includes a supporting frame and a presser member movably mounted upon said frame and having a shrimp engaging surface cooperating with and opposed to said moving surface, a connection securing said presser member to said frame for limited relative movement, said connection including a slot in said frame and a stem on said presser member freely slidable in said slot whereby said presser member may be gravity urged only to apply pressure to a shrimp disposed between said surfaces.

26. The combination of claim 1 wherein said peeling element is elongated and a plurality of aligned assister peelers are disposed in side-by-side relation to said peeling element.

27. The combination of claim 26 wherein all of said aligned assister peelers are actuated in unison by said means for causing movement of said assister peelers.

28. The combination of claim 3 wherein said peeling elements are elongated and are disposed in side-by-side relation, a plurality of aligned presser members disposed in side-by-side relation to said peeling elements.

29. The combination of claim 28 wherein all of said presser members are actuated in unison by said means for causing motion of said pressure members.

30. The combination of claim 3 wherein said peeling elements are elongated and are disposed in side-by-side relation, a plurality of aligned presser members disposed in side-by-side relation to said peeling elements, said presser members being in endwise spaced relation to each other.

References Cited in the file of this patent

UNITED STATES PATENTS

| | | |
|---|---|---|
| 2,537,355 | Lapeyre et al. | Jan. 9, 1951 |
| 2,778,055 | Lapeyre et al. | Jan. 22, 1957 |
| 2,781,544 | Skrmetta | Feb. 19, 1957 |